(12) United States Patent
Cattoor et al.

(10) Patent No.: US 11,802,596 B2
(45) Date of Patent: Oct. 31, 2023

(54) SYSTEMS AND METHODS FOR ROTARY SEAL DRAG REDUCTION

(71) Applicant: Dana Belgium N.V., Flanders (BE)

(72) Inventors: Kurt Cattoor, Koolkerke (BE); Filip D. Schacht, Meulebeke (BE); Joachim Van Dingenen, Drongen (BE); Tommy Van Acker, Lievegem (BE)

(73) Assignee: DANA BELGIUM N.V., Bruges (BE)

( * ) Notice: Subject to any disclaimer, the term of this patent is extended or adjusted under 35 U.S.C. 154(b) by 1 day.

(21) Appl. No.: 17/452,348

(22) Filed: Oct. 26, 2021

(65) Prior Publication Data
US 2022/0163074 A1     May 26, 2022

Related U.S. Application Data

(60) Provisional application No. 63/118,551, filed on Nov. 25, 2020.

(51) Int. Cl.
| | |
|---|---|
| *F16D 48/02* | (2006.01) |
| *F16D 43/284* | (2006.01) |
| *F16D 25/0638* | (2006.01) |

(52) U.S. Cl.
CPC ....... *F16D 43/284* (2013.01); *F16D 25/0638* (2013.01); *F16D 25/14* (2013.01); *F16D 48/0206* (2013.01); *F16D 2048/0221* (2013.01)

(58) Field of Classification Search
CPC .. F16D 25/0638; F16D 25/14; F16D 48/0206; F16D 2048/0221; F16D 2500/1026; F16D 2500/10412; F16D 2500/3024; F16D 2500/30816; F16D 2500/30825; F16D 48/066; F16D 2300/08; F16D 2500/30415; F16D 2500/3067; F16D 2500/70406; F16D 43/284; F16H 61/0206; F16H 61/061; F16H 63/3026; F16H 61/0204; F16H 61/40; F16H 63/40; F16H 61/0003; F16H 61/0009; F16H 61/0021; F16H 2061/0046; F16H 2061/0053; F16H 2061/0075–0096
See application file for complete search history.

(56) References Cited

U.S. PATENT DOCUMENTS

| | | | |
|---|---|---|---|
| 2,653,833 A | 9/1953 | Barron | |
| 4,307,425 A * | 12/1981 | Kaneko | G11B 23/507 236/44 R |

(Continued)

FOREIGN PATENT DOCUMENTS

WO     0015983 A1    3/2000

*Primary Examiner* — Timothy Hannon
*Assistant Examiner* — Farhana Pervin
(74) *Attorney, Agent, or Firm* — McCoy Russell LLP (57) ABSTRACT

Methods and systems are provided for wet clutch pressure control to reduce drag and degradation of rotary seals in a transmission. In one example, a method may include determining an upper threshold pressure based on a rotational speed of a shaft of the transmission, determining a lower threshold pressure based on the rotational speed of the shaft, and adjusting a pressure of hydraulic fluid applied to the clutch to be between the upper threshold pressure and the lower threshold pressure. In this way, the pressure of the hydraulic fluid applied to the clutch may be maintained at a level that allows full torque transfer by the wet clutch while reducing drag on the rotary seals.

18 Claims, 7 Drawing Sheets

(56) References Cited

U.S. PATENT DOCUMENTS

| | | | |
|---|---|---|---|
| 4,842,115 A * | 6/1989 | Ohzono | F16D 43/284 |
| | | | 192/85.24 |
| 6,086,513 A * | 7/2000 | Tominaga | F16H 61/0021 |
| | | | 477/169 |
| 6,505,838 B1 | 1/2003 | Cavaliere | |
| 7,063,198 B2 | 6/2006 | Fratta et al. | |
| 7,556,120 B2 * | 7/2009 | Sah | F16H 61/0031 |
| | | | 180/305 |
| 8,401,756 B2 | 3/2013 | Wilson et al. | |
| 9,334,946 B1 | 5/2016 | Mason | |
| 9,587,684 B2 | 3/2017 | Webert et al. | |
| 11,073,308 B2 * | 7/2021 | de Waele | F25B 9/06 |
| 2003/0111314 A1 * | 6/2003 | Moorman | F16D 48/02 |
| | | | 192/85.25 |
| 2005/0067251 A1 | 3/2005 | Braford, Jr. et al. | |
| 2006/0086586 A1 * | 4/2006 | Braford | F16D 21/06 |
| | | | 192/106 F |
| 2007/0221467 A1 * | 9/2007 | Stevenson | F16D 48/0206 |
| | | | 192/48.601 |
| 2009/0242348 A1 * | 10/2009 | Ishikawa | F16D 25/0638 |
| | | | 192/55.61 |
| 2011/0319226 A1 | 12/2011 | Brevick et al. | |
| 2014/0305412 A1 * | 10/2014 | Ahrns | F02D 41/0007 |
| | | | 123/564 |
| 2016/0193995 A1 * | 7/2016 | Kim | B60W 10/06 |
| | | | 180/65.265 |
| 2017/0080767 A1 * | 3/2017 | Yamashita | F16F 9/182 |
| 2018/0010320 A1 * | 1/2018 | Yoshikawa | F16D 48/066 |
| 2018/0141535 A1 * | 5/2018 | Yoshioka | B60W 20/00 |
| 2020/0318730 A1 * | 10/2020 | Heubner | F16H 3/006 |
| 2020/0362961 A1 * | 11/2020 | Harada | F16H 59/18 |
| 2021/0140536 A1 * | 5/2021 | Nakasone | F16H 61/4008 |
| 2021/0199161 A1 * | 7/2021 | Eto | F16D 13/52 |
| 2021/0310525 A1 * | 10/2021 | Nishiyabu | F16D 25/14 |
| 2022/0205496 A1 * | 6/2022 | Wei | F16D 48/0206 |

* cited by examiner

SYSTEMS AND METHODS FOR ROTARY SEAL DRAG REDUCTION

CROSS-REFERENCE TO RELATED APPLICATIONS

The present application claims priority to U.S. Provisional Application No. 63/118,551 entitled "SYSTEMS AND METHODS FOR ROTARY SEAL DRAG REDUCTION", and filed on Nov. 25, 2020. The entire contents of the above-listed application are hereby incorporated by reference for all purposes.

TECHNICAL FIELD

The present description relates generally to methods and systems for controlling pressure on a wet clutch.

BACKGROUND AND SUMMARY

Some vehicles may have a hydraulic transmission system that hydraulically locks and unlocks a system of gears to change gear ratios. For example, the transmission system may employ one or more wet clutches to facilitate gear shifting. Oil is supplied to the wet clutch from an oil pan and through hydraulic valves and channels. Within the channels, the oil is transferred from a housing to a shaft. The oil is kept from spilling between the housing and shaft by rotary seals located between the housing and the shaft. A pressure of the oil applied to the wet clutch, referred to herein as a clutch pressure, is equal to the pressure applied to the rotary seals, which produces drag on the rotary seals. In some examples, the clutch pressure may be kept at a constant, high level to prevent inadvertent clutch opening or clutch slip, particularly when maximum torque is applied by the engine. Over time, the high pressure applied to the rotary seals may cause wear on the seals and reduce their product lifetime.

The inventors herein have identified the above-mentioned issues and have engineered a way to at least partially address them. In one example, the issues described above may be addressed by a method for hydraulic control of a clutch in a transmission, comprising: determining an upper threshold pressure based on a rotational speed of a shaft of the transmission; determining a lower threshold pressure based on the rotational speed of the shaft; and adjusting the pressure of hydraulic fluid applied to the clutch to be between the upper threshold pressure and the lower threshold pressure. In this way, drag wear on the rotary seals may be reduced by controlling the pressure applied to the rotary seals without compromising the functionality of the clutch.

As one example, the upper threshold pressure may be further determined based on one or more properties of a rotary seal positioned between the shaft and a housing of the transmission. For example, the upper threshold pressure may be a varying pressure value above which degradation of the seal ring may be increased at the given rotational speed of the shaft. As another example, the lower threshold pressure may be a minimum pressure for maintaining the clutch closed at the given rotational speed of the shaft. As a further example, adjusting the pressure of the hydraulic fluid applied to the clutch may include adjusting an opening of a pressure regulating valve positioned in a flow path between an oil pan and a piston of the clutch, the pressure regulating valve upstream of the rotary seal. For example, the pressure regulating valve may be a proportional valve, and the pressure regulating valve may be further opened to increase the pressure and further closed to decrease the pressure. In some examples, the clutch may be opened responsive to the pressure of the hydraulic fluid applied to the clutch being greater than the upper threshold pressure for at least a threshold duration. Additionally or alternatively, a torque output of an engine rotationally coupled to the transmission may be reduced responsive to the pressure of the hydraulic fluid applied to the clutch being greater than the upper threshold pressure for at least the threshold duration. As a result, wear of the rotary seal may be reduced, extending a lifetime of the rotary seal and reducing repair and maintenance costs.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

The following description relates to systems and methods for wet clutch pressure control. The transmission may be the transmission schematically shown in FIG. 1, for example, including multiple wet clutches. For example, one or more of the wet clutches included in the system of FIG. 1 may have the example wet clutch configuration shown in FIG. 2. For example, the wet clutches may be individually controlled via the hydraulics system shown in FIG. 4. Further, hydraulic fluid supplied to each wet clutch may flow past a rotary seal, such as the rotary seal shown in FIG. 3. For example, a pressure of the hydraulic fluid supplied to the wet clutch is also applied to the rotary seal. Therefore, the pressure may be regulated to reduce drag on the rotary seal in order to reduce wear and degradation of the rotary seal, such as according to the method of FIG. 5. For example, the pressure may be maintained between an upper threshold pressure for reducing rotary seal wear and a lower threshold for maintaining clutch functionality, such as the thresholds illustrated in FIG. 6. Further, an example timeline for varying clutch and rotary seal pressure is shown in FIG. 7.

Figure 1:
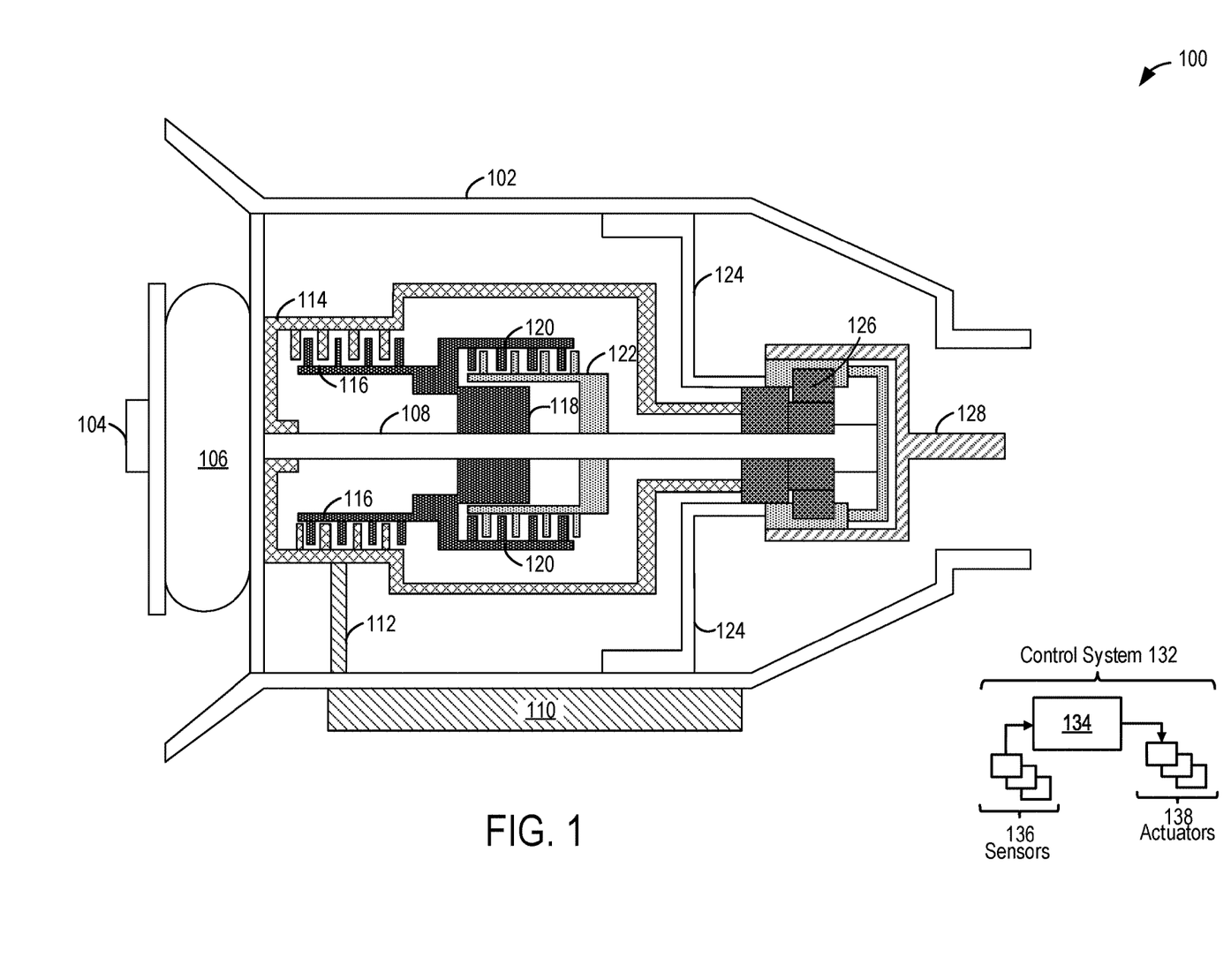
FIG. 1 is a schematic cross-sectional view of an exemplary automatic transmission.

Turning now to the figures, FIG. 1 schematically shows an example of an automatic transmission 100, which may be included in a vehicle. However, in other examples, transmission 100 may be another type of transmission (e.g., a dual clutch transmission). Transmission 100 is encompassed by a transmission case 102 that protects moving clutches and gears, shafts, hydraulics, and other parts within transmission 100. A fly wheel 104 connects transmission 100 to an engine (not shown). Fly wheel 104 connects an output from the engine to an input of a torque convertor 106.

Torque convertor 106 transfers power from the engine to an input shaft 108. Torque transferred from the engine to input shaft 108 may be multiplied by a stator (not shown) within torque convertor 106. Input shaft 108 is coupled to a planetary gear set 126, and input shaft 108 transfers the torque generated by the engine to planetary gear set 126. In transmission 100, planetary gear set 126 defines a certain torque ratio towards an output shaft 128. In an automatic transmission, an algorithm in a transmission control unit (TCU) 134 determines when to shift based on measurements such as the engine or input shaft 108 speeds. TCU 134 may, via a hydraulic valve, open one clutch of the automatic transmission while closing another clutch and thus change the torque ratio towards output shaft 128. Planetary gear set 126 may have five gear configurations for forward drive and one for reverse drive. Output shaft 128 is coupled to planetary gear set 126. Output shaft 128 carries the rotational energy from the transmission 100 to wheels (not shown) on the vehicle. The output shaft 128 turns at a speed determined by which gears within planetary gear set 126 are active.

Below the transmission case 102 is an oil pan 110, which contains a hydraulic fluid volume used by the hydraulics control components (e.g., pressure regulating valves, a pump, and hydraulic channels or tubes). For example, the hydraulic fluid may be at least partially comprised of oil. Therefore, hydraulic fluid will also be referred to herein as "oil" or "hydraulic oil." The hydraulic fluid may provide hydraulic control of various components of transmission 100, including one or more clutches (as will be elaborated herein) as well as lubrication. Therefore, as an example, a hydraulic line 112 fluidically couples oil pan 110 to a first clutch 116 in order to provide the hydraulic fluid to first clutch 116. Note that while one hydraulic line 112 is shown, a plurality of hydraulic lines may be present to deliver the hydraulic fluid from oil pan 110 to various components of transmission 100 and back to oil pan 110.

Input shaft 108 is coupled to a first gear 114, which is selectively coupled to a second gear 118 via first clutch 116. Second gear 118 is selectively coupled to a third gear 122 by a second clutch 120. First gear 114, second gear 118, and third gear 122 are connected to planetary gear set 126 by first gear 114. When first clutch 116 or second clutch 120 are engaged, friction plates within the clutches are pressed against the separator plates, resulting in an input of the corresponding clutch being mechanically coupled to an output of the corresponding clutch. For example, when first clutch 116 and second clutch 120 are both disengaged, first gear 114 is coupled to planetary gear set 126, resulting in a first gear ratio. When first clutch 116 is engaged and second clutch 120 is disengaged, second gear 118 is coupled to planetary gear set 126, resulting in a second gear ratio. When first clutch 116 and second clutch 120 are both engaged, third gear 122 is coupled to planetary gear set 126, resulting in a third gear ratio. Hydraulic control of the different clutches will be further elaborated below with respect to FIG. 4.

Transmission 100 may be at least partially controlled by a control system 132, including TCU 134, and by input from a driver. TCU 134 is shown receiving information from a plurality of sensors 136 and sending control signals to a plurality of actuators 138. For example, sensors 136 may include a vehicle speed sensor, a transmission fluid temperature sensor, various transmission fluid pressure sensors, and a shaft speed sensor. As another example, actuators 138 may include a one or more pressure regulating valves, examples of which will be described herein with respect to FIG. 4, a pump, etc. Further, control system 132 may include other control units (e.g., an engine control unit) in addition to TCU 134. The various control units within control system 132 may communicate over a controller area network (CAN). Further, TCU 134 (and the other control units in control system 132) may be a microcomputer (e.g., microcontroller), including a microprocessor unit, input/output ports, an electronic storage medium for executable programs and calibration values (e.g., a non-transitory or read-only memory, ROM), a random access memory (RAM), a keep alive memory (KAM), and a data bus. The storage medium read-only (e.g., non-transitory) memory may be programmed with computer readable data representing instructions executable by the microprocessor for performing the methods and routines described herein as well as other variants that are anticipated but not specifically listed.

Figure 2:
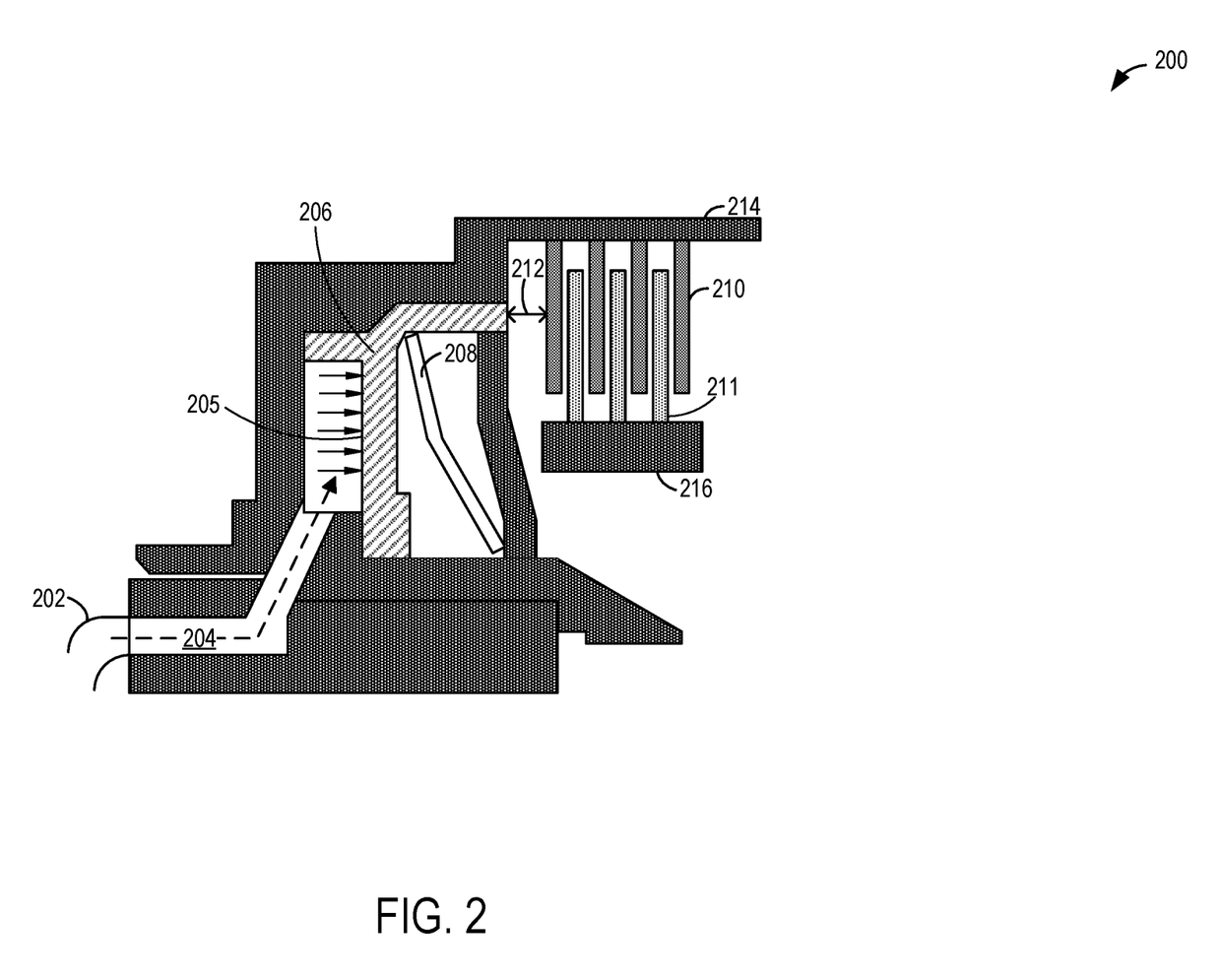
FIG. 2 is a cross-sectional schematic view of an exemplary wet clutch.

FIG. 2 schematically shows an example configuration of a wet clutch 200. Wet clutch 200 may be an example of one of a plurality of clutches included in a transmission (e.g., transmission 100 of FIG. 1). For example, wet clutch 200 may be first clutch 116 or second clutch 120 of FIG. 1. Wet clutch 200 includes a hydraulic tube 202 that connects to a hydraulic channel 204 within wet clutch 200, fluidically coupling hydraulic channel 204 (and therefore wet clutch 200) to an oil supply (e.g., oil pan 110 shown in FIG. 1). Oil flows from the oil supply to a wet clutch piston 206 within wet clutch 200 via hydraulic tube 202 to hydraulic channel 204. A direction of the oil flow is indicated by the dashed arrow going from hydraulic tube 202 to wet clutch piston 206. The oil applies a pressure to a side-surface 205 of wet clutch piston 206. Arrows indicate the direction pressure is applied to side-surface 205. Within wet clutch piston 206 is a disc spring 208. Disc spring 208 compresses as oil from hydraulic channel 204 presses against side-surface 205. Increasing the pressure applied to side-surface 205 further compresses disc spring 208. Once a frictional resistance and a return spring force of disc spring 208 are overcome by a hydraulic force from the pressure applied to side-surface 205, wet clutch piston 206 moves rightward until a gap 212 between wet clutch piston 206 and clutch separator discs 210 and clutch friction discs 211 (e.g., a clutch pack) is eliminated. Wet clutch piston 206 in turn applies a force to clutch separator discs 210 and to clutch friction discs 211, causing the clutch separator discs 210 to touch clutch friction discs 211. When clutch separator discs 210 and clutch friction discs 211 are touching (e.g., engaged), an input 214 of wet clutch 200 is coupled to an output 216 of wet clutch 200. When clutch separator discs 210 and clutch friction discs 211 are not touching (e.g., disengaged), input 214 is not coupled to output 216. Thus, when clutch separator discs 210 and clutch friction discs 211 are disengaged, gears coupled to input 214 are inactive and are not applying a rotational force to an output shaft (e.g., output shaft 128 shown in FIG. 1) coupled to output 216. When clutch separator discs 210 and clutch friction discs 211 are engaged, gears coupled to input 214 are active and are applying a rotational force to the output shaft. Additionally, increasing the pressure applied to the clutch friction discs 211 and clutch separator discs 210 increases the amount of torque that may be transferred between input 214 and output 216.

Figure 4:
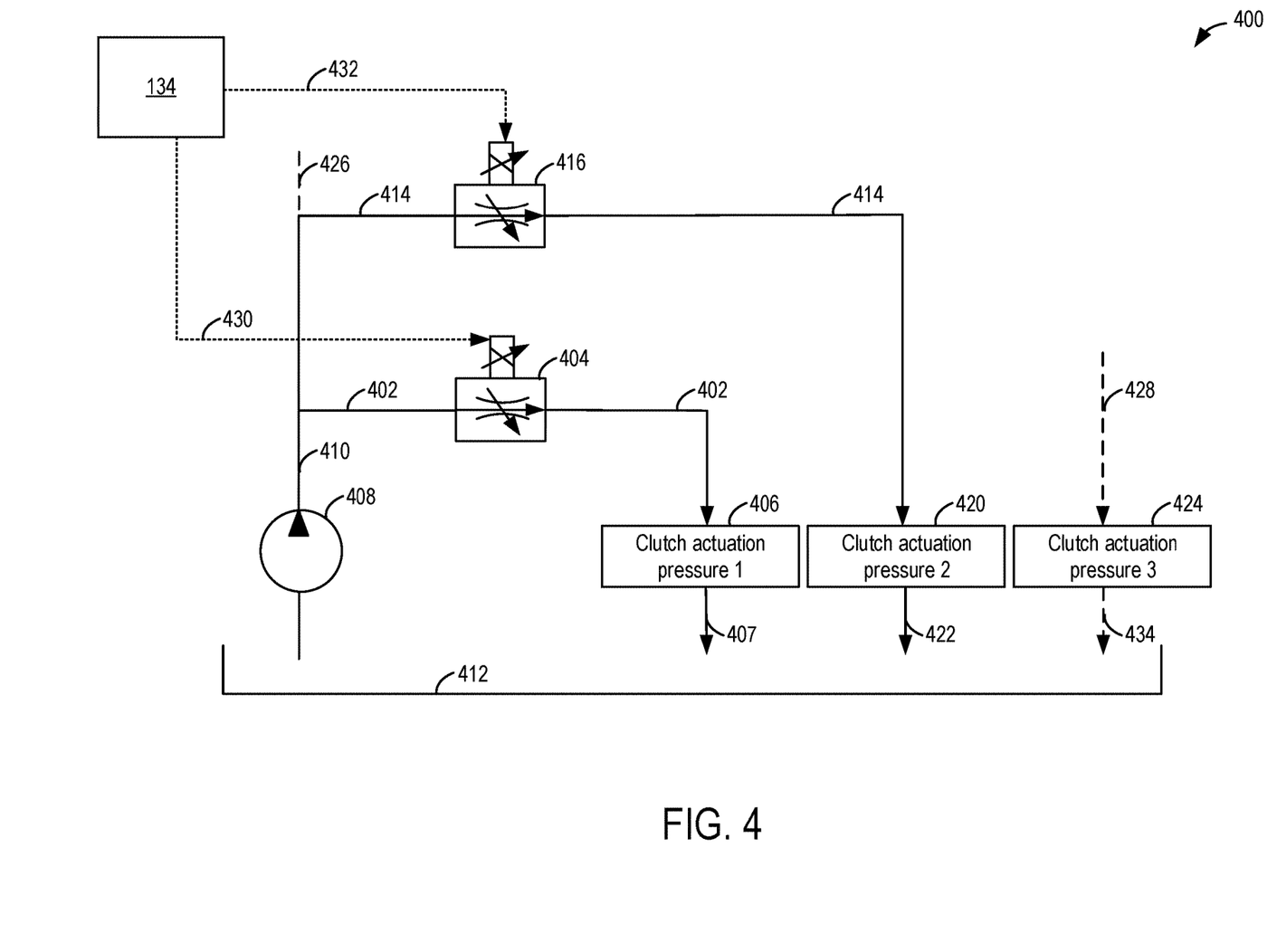
FIG. 4 is an example hydraulic diagram of wet clutch pressure control.

Oil supplied to wet clutch 200 may travel through various components of the transmission in order to reach the clutch (to be described in more detail with respect to FIG. 4). For example, the oil may pass from a static housing to a rotating shaft that includes a channel to wet clutch piston 206. Rotary seals may be positioned to facilitate the transition of the oil between the housing and the shaft. For example, the rotary seals may keep the oil from spilling out between the static housing and rotating shaft and maintaining the oil pressure between the housing and the shaft.

Figure 3:
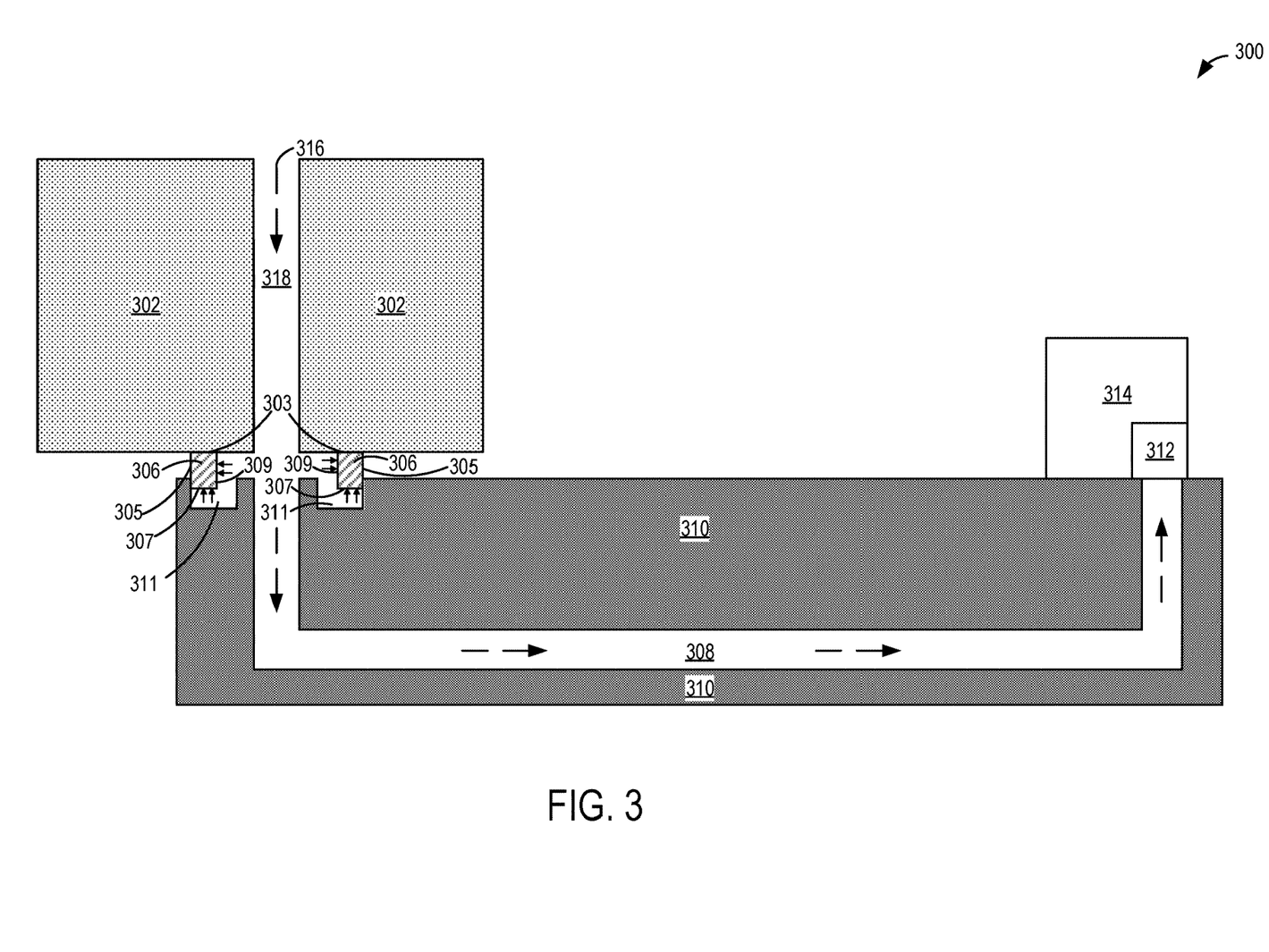
FIG. 3 schematically shows exemplary rotary seals that may be included in a hydraulic circuit of an automatic transmission.

FIG. 3 schematically shows an example of a hydraulic circuit 300 that includes rotary seals 306 between a static housing 302 and a rotatable shaft 310 in order to seal a fluidic coupling between a first hydraulic channel 318 within static housing 302 and a second hydraulic channel 308 within shaft 310. Rotary seals 306 are positioned within a shaft groove (ring groove) 311 formed on the outer peripheral surface of shaft 310 on each of axially opposite sides of second hydraulic channel 308. Thus, the rotary seals 306 are positioned proximate to the shaft 310. A hydraulic oil supplied from first hydraulic channel 318 is received by a pressure-receiving side-surface 309 and an inner peripheral surface 307 of each rotary seals 306. An outer peripheral surface 303 of each rotary seals 306 is in contact with the inner surface of housing 302, and a contact side-surface 305 of each rotary seals 306 is in contact with a side surface of the shaft groove 311. The hydraulic pressure is thereby sealed. In the example shown, shaft 310 is rotatable, and housing 302 is stationary. However, in other examples, shaft 310 may be stationary, and housing 302 may be rotatable.

The hydraulic oil transverses a flow path through first hydraulic channel 318 in housing 302 into second hydraulic channel 308 within shaft 310, in the direction of dashed arrows 316. For example, the hydraulic oil may flow through a flow path from a pressure regulating valve positioned upstream of first hydraulic channel 318. Second hydraulic channel 308 fluidically couples first hydraulic channel 318 to a clutch piston 312 located within a wet clutch 314. Wet clutch 314 may include the clutch configuration of wet clutch 200 shown in FIG. 2, for example. The oil flowing to clutch piston 312 applies pressure to clutch piston 312 and pressure to rotary seals 306 on the pressure-receiving side-surface 309 and the inner peripheral surface 307. Static friction occurs between the outer peripheral surface 303 and housing 302, which is caused by oil pressure against inner peripheral surface 307, shown by arrows. The static friction helps maintain rotary seals 306 in a stationary position against housing 302. Dynamic friction occurs on contact side-surface 305 in contact with shaft 310. The dynamic friction causes drag or energy loss as well as wear on rotary seals 306, which, over time, can cause rotary seals 306 to degrade. By reducing the pressure on clutch piston 312, the oil pressure against the pressure-receiving side-surface 309 (indicated by arrows) is also reduced, which in turn decreases the dynamic friction between contact side-surface 305 and shaft 310. Thus, controlling the pressure applied to clutch piston 312 to reduce the dynamic friction between contact side-surface 305 and shaft 310 while still providing accurate clutch control may reduce degradation of rotary seals 306 and extend a lifetime of rotary seals 306.

In particular, the pressure applied to clutch piston 312, as well as any other clutch pistons in the transmission, may be controlled via a pressure regulating valve (e.g., a proportional valve) positioned within a hydraulic circuit of wet clutch 314. Referring now to FIG. 4, an exemplary hydraulic diagram 400 for individual clutch pressure control within a transmission is shown. A hydraulic fluid from a reservoir 412 is delivered to a first hydraulic tube (e.g., conduit or passage) 410 via a pump 408. For example, reservoir 412 may be oil pan 110 of FIG. 1. Additional hydraulic tubes branch from first hydraulic tube 410 to provide the hydraulic fluid to individual clutches of the transmission. In the example shown, a second hydraulic tube 402 fluidically couples first hydraulic tube 410 to a first clutch, and a third hydraulic tube 414 fluidically couples first hydraulic tube 410 to a second clutch. A first proportional pressure regulating valve 404 disposed within second hydraulic tube 402 regulates a first clutch actuation pressure 406 applied to the first clutch, and a second proportional pressure regulating valve 416 regulates a second clutch actuation pressure 420 applied to the second clutch. For example, a pressure in second hydraulic tube 402 downstream of first proportional pressure regulating valve 404 and applied to the first clutch may be adjusted by adjusting an opening of first proportional pressure regulating valve 404. In general, as an opening of first proportional pressure regulating valve 404 increases, first clutch actuation pressure 406 increases. Conversely, further closing first proportional pressure regulating valve 404 decreases first clutch actuation pressure 406. A pressure in third hydraulic tube 414 downstream of second proportional pressure regulating valve 416 and applied to the second clutch may be adjusted by adjusting an opening of second proportional pressure regulating valve 416 in a similar manner. In the example shown, each of first proportional pressure regulating valve 404 and second proportional pressure regulating valve 416 is a solenoid type valve. In other examples, one or both of first proportional pressure regulating valve 404 and second proportional pressure regulating valve 416 may be a vacuumed actuated valve or another type of electrically actuated valve system.

The plurality of proportional pressure regulating valves may be controlled by a transmission control unit (TCU) 134 shown also in FIG. 1. For example, TCU 134 may vary a first control signal 430 to first proportional pressure regulating valve 404 to increase or decrease the flow through first proportional pressure regulating valve 404, subsequently changing first clutch actuation pressure 406. As another example, a second control signal 432 may be sent from TCU 134 to second proportional pressure regulating valve 416, controlling the flow through second proportional pressure regulating valve 416 and subsequently second clutch actuation pressure 420.

The hydraulic fluid returns to reservoir 412 through return passages or tubes to finish the hydraulic circuit. For example, the hydraulic fluid flows from the first clutch to reservoir 412 via a first return tube 407, and the hydraulic fluid flows from the second clutch to reservoir 412 via a second return tube 422.

Hydraulic diagram 400 may be extended to control clutch actuation pressures for any number wet clutches present in the given transmission system, as indicated by dotted lines. For example, dotted line 426 indicates that first hydraulic tube 410 may extend to supply the hydraulic fluid to additional clutches, such as to a third clutch, via a fourth hydraulic tube 428. Although not specifically shown, a proportional pressure regulating valve may be used to vary the actuation pressure supplied to each additional clutch. For example, a third clutch actuation pressure 424 may be provided to the third clutch and may be adjusted by adjusting an opening of a third proportional pressure regulating valve. Hydraulic fluid from the third clutch may return to reservoir 412 through return tube 434. As such, each clutch within the transmission may receive its own actuation pressure, which may be individually adjusted from the actuation pressures of the other clutches.

Changing the pressure to the wet clutch piston changes the pressure applied to a rotary seal (e.g., rotary seals 306 as shown in FIG. 2). TCU 134 may decrease the flow through first proportional pressure regulating valve 404 to decrease the pressure on the wet clutch piston and thus decrease the pressure on the rotary seal. As stated above with respect to FIG. 3, decreasing the pressure on the rotary seal decreases the dynamic friction between the rotary seal and a rotary shaft (e.g. shaft 310 shown in FIG. 3). The decrease in friction can allow for less wear on the rotary seal, increasing longevity of the rotary seal.

Figure 5:
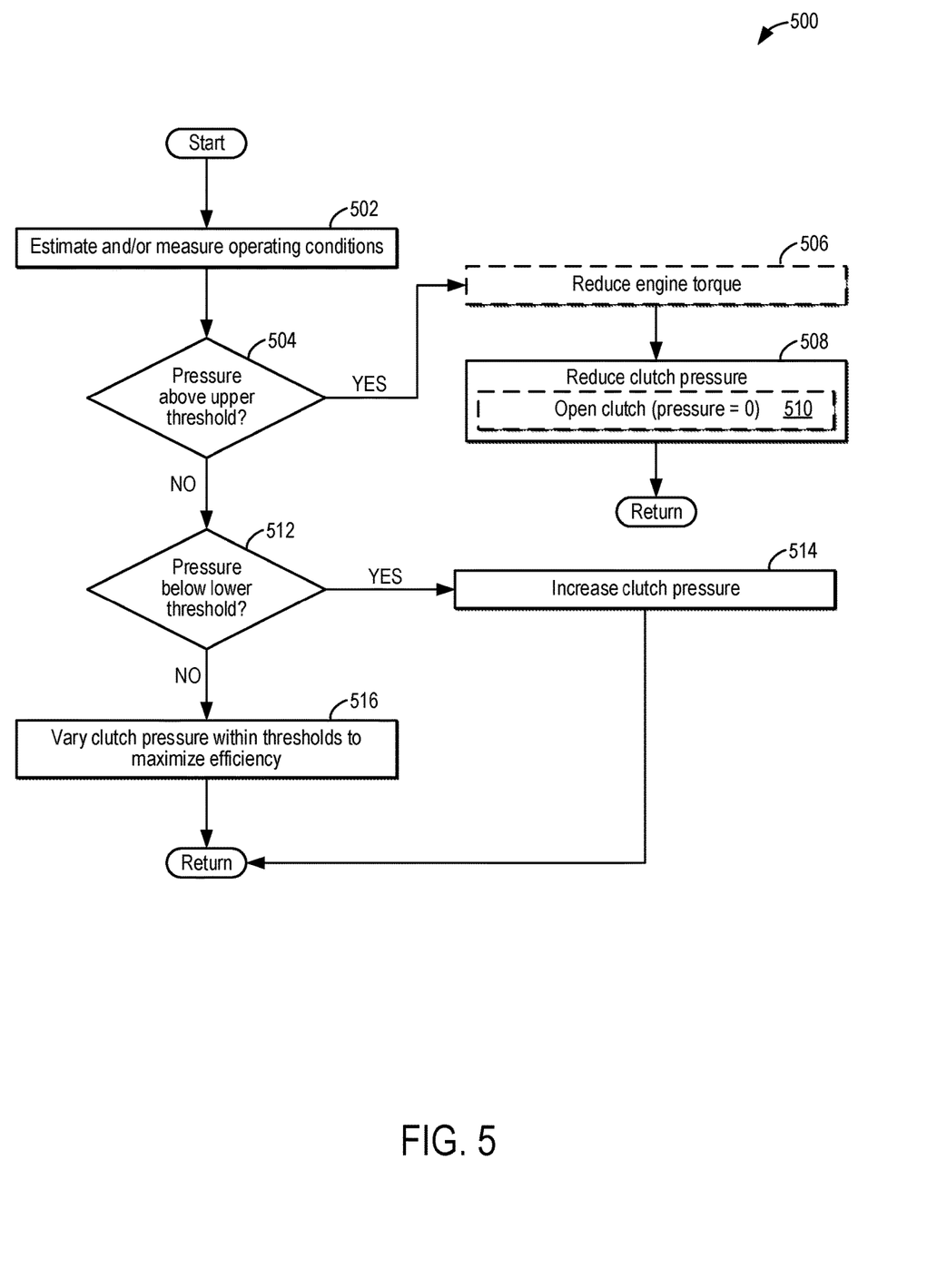
FIG. 5 shows a method for wet clutch pressure control to decrease rotary seal drag.

Therefore, FIG. 5 provides a method 500 for controlling clutch pressure for reducing wear on rotary seals. For example, the clutch may be operated with a variable clutch pressure instead of a fixed clutch pressure in order to reduce drag on the rotary seal. Instructions for carrying out method 500 and the rest of the methods included herein may be executed by a controller (e.g., transmission control unit 134 shown in FIG. 1) based on instructions stored on a memory of the controller and in conjunction with signals received from sensors of the transmission system. The controller may employ transmission actuators of the transmission system to adjust transmission operation, according to the methods described below.

At 502, method 500 includes estimating and/or measuring operating conditions. For example, a pressure, p, on a clutch piston (e.g., wet clutch piston 206 of FIG. 2) and a shaft speed, V, of a rotary shaft (e.g., shaft 310 shown in FIG. 3) may be measured. In one example, the pressure may be determined by determining the openness of a pressure regulating valve positioned in a hydraulic tube that supplies hydraulic fluid to the clutch piston (e.g., first proportional pressure regulating valve 404 shown in FIG. 4). In another example, the pressure may be directly measured by a pressure sensor positioned in the hydraulic tube downstream of the pressure regulating valve. Additional operating conditions may include engine torque, a gear ratio of the transmission, a state of each clutch of the transmission (e.g., engaged or disengaged), etc.

At 504, method 500 includes determining if the pressure is above an upper threshold pressure. The upper threshold pressure is a non-zero, positive pressure value that varies based on the shaft rotational speed. At pressures above the upper threshold pressure, degradation may occur on a rotary seal (e.g. rotary seals 306 shown in FIG. 3) due to increased drag torque on the rotary seal. The upper threshold pressure may be determined in real time by the controller using a relationship stored in memory. For example, the controller may input the current shaft speed into a look-up table, algorithm, or function, which may output the upper threshold pressure for the input shaft speed. As another example, within the controller memory, one or more properties of the rotary seal (e.g. material, thickness, diameter, etc.) may be stored to calculate the upper threshold pressure specific to the rotary seal ring being used. In general, the upper threshold pressure decreases with increasing speed of the shaft. An example of the upper threshold pressure will be described below with respect to FIG. 6. The controller may then compare the current pressure to the determined upper threshold pressure to determine whether the current pressure on the wet clutch is above the upper threshold pressure.

If the pressure is above the upper threshold pressure, method 500 proceeds to 506 and optionally includes reducing the engine torque. In some conditions, pressure that exceeds the upper threshold pressure on the wet clutch and rotary seal may be prolonged (e.g. during overspeeding). Thus, the engine torque may be reduced when the pressure exceeds the upper threshold pressure for at least a threshold duration. The threshold duration may be a pre-programmed, non-zero amount of time stored in a memory of the controller. Further, the overspeeding may occur when the speed of the rotary shaft is above a speed threshold, also a non-zero positive speed value stored in the memory of the controller. In such conditions, such as when the speed of the rotary shaft is greater than the speed threshold and/or the pressure applied to the wet clutch is greater than the upper threshold pressure for at least the threshold duration, an algorithm to reduce degradation of the rotary seal by reducing the engine torque is initiated. For example, the engine torque may be reduced by the controller sending a controller area network (CAN) message to an engine control unit (ECU) to request the reduction in engine torque. By reducing the engine torque, the speed of the shaft may be reduced, allowing for the upper threshold pressure to increase.

However, in other examples, 506 may be omitted, and method 500 may proceed directly to 508. At 508, method 500 includes reducing the pressure on the clutch. As one example, reducing the pressure on the clutch may include the controller adjusting the pressure regulating valve to a further closed position. As an example, the controller may determine how much to close the valve (e.g., a degree of valve closing) by inputting the current pressure and the shaft speed into one or more look-up tables, algorithms, or maps, which may output a valve adjustment (or a further closed valve position) that will reduce the pressure to below the upper threshold pressure. In some examples, the controller may further take into account an efficiency map of the rotary seal, an example of which is further described below with respect to FIG. 6. The controller may then transmit a control signal to the pressure regulating valve to adjust it to the further closed valve position. With the pressure regulating valve adjusted to the further closed position, flow is further restricted through the pressure regulating valve, which reduces the pressure supplied to the clutch as well as the rotary seals.

Reducing the pressure on the clutch optionally includes opening the wet clutch by removing the pressure on the clutch, as indicated at 510. For example, 510 may be performed when reducing engine torque and partially closing the pressure regulating valve does not lower the pressure below the upper threshold pressure. The TCU may fully close the pressure regulating valve (e.g., by sending an appropriate control signal to the pressure regulating valve), preventing hydraulic fluid from flowing to the rotary seals and the wet clutch piston and applying pressure to the rotary seals and the wet clutch piston. Reducing the pressure to zero causes the wet clutch to open and become disengaged. Additionally, with the pressure on the rotary seals reduced, the pressure is less than the upper threshold pressure for the given shaft speed. Method 500 may then return.

Returning to 504, if the pressure is not above the upper threshold pressure, method 500 proceeds to 512 and includes determining if the pressure is below a lower threshold pressure. The lower threshold pressure corresponds to a minimum pressure for maintaining the clutch closed and transferring applied torque via the clutch. Therefore, the lower threshold pressure may be determined by the controller using the current speed of the shaft. For example, the controller may input the current speed of the shaft into a look-up table, algorithm, or map stored in memory, which may output the lower threshold pressure at the given shaft speed.

If the controller determines that the current pressure is below the lower threshold pressure, method 500 proceeds to 514 and includes increasing the clutch pressure. As one example, increasing the pressure on the clutch may include the controller adjusting the pressure regulating valve to a further open position. As an example, the controller may determine how much to open the valve (e.g., a degree of valve opening) by inputting the current pressure and the shaft speed into one or more look-up tables, algorithms, or maps, which may output a valve adjustment (or a further open valve position) that will increase the pressure to above the lower threshold pressure. In some examples, the controller may further take into account the efficiency map of the rotary seal, as mentioned above. The controller may then transmit a control signal to the pressure regulating valve to adjust it to the further open valve position. This allows more hydraulic fluid to flow through the valve, increasing the pressure on the wet clutch and rotary seals. Method 500 may then return.

If instead the controller determines that the current pressure is above the lower threshold pressure at 512, method 500 proceeds to 516 and includes varying the clutch pressure within thresholds based on the efficiency map of the rotary seals. As an example, the controller may determine how much to open the valve (e.g., a degree of valve opening) by inputting the current pressure and the shaft speed into one or more look-up tables, algorithms, or maps, which may output a valve adjustment that will increase or decrease the pressure so that the pressure is on the efficiency map of the rotary seals, which will be elaborated with respect to FIG. 6. Method 500 may then return. In this way, the pressure applied to the clutch may be continuously compared (or compared at a pre-determined frequency) to the varying upper and lower threshold pressures, with adjustments made accordingly in order to accurately control the clutch while also reducing the drag force on the rotary seals.

Figure 6:
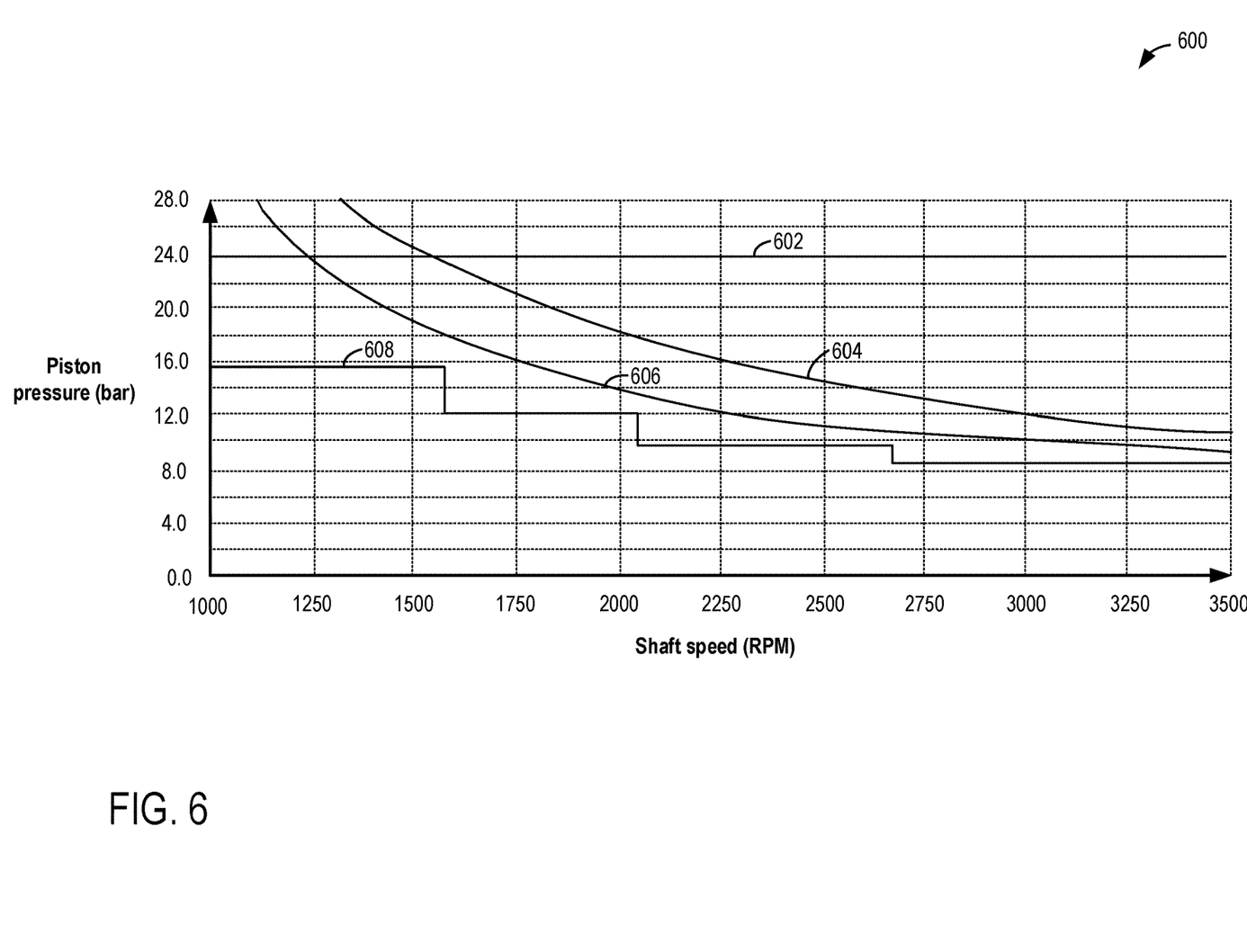
FIG. 6 shows an example graph of wet clutch pressure thresholds at different shaft speeds of an automatic transmission.
Figure 7:
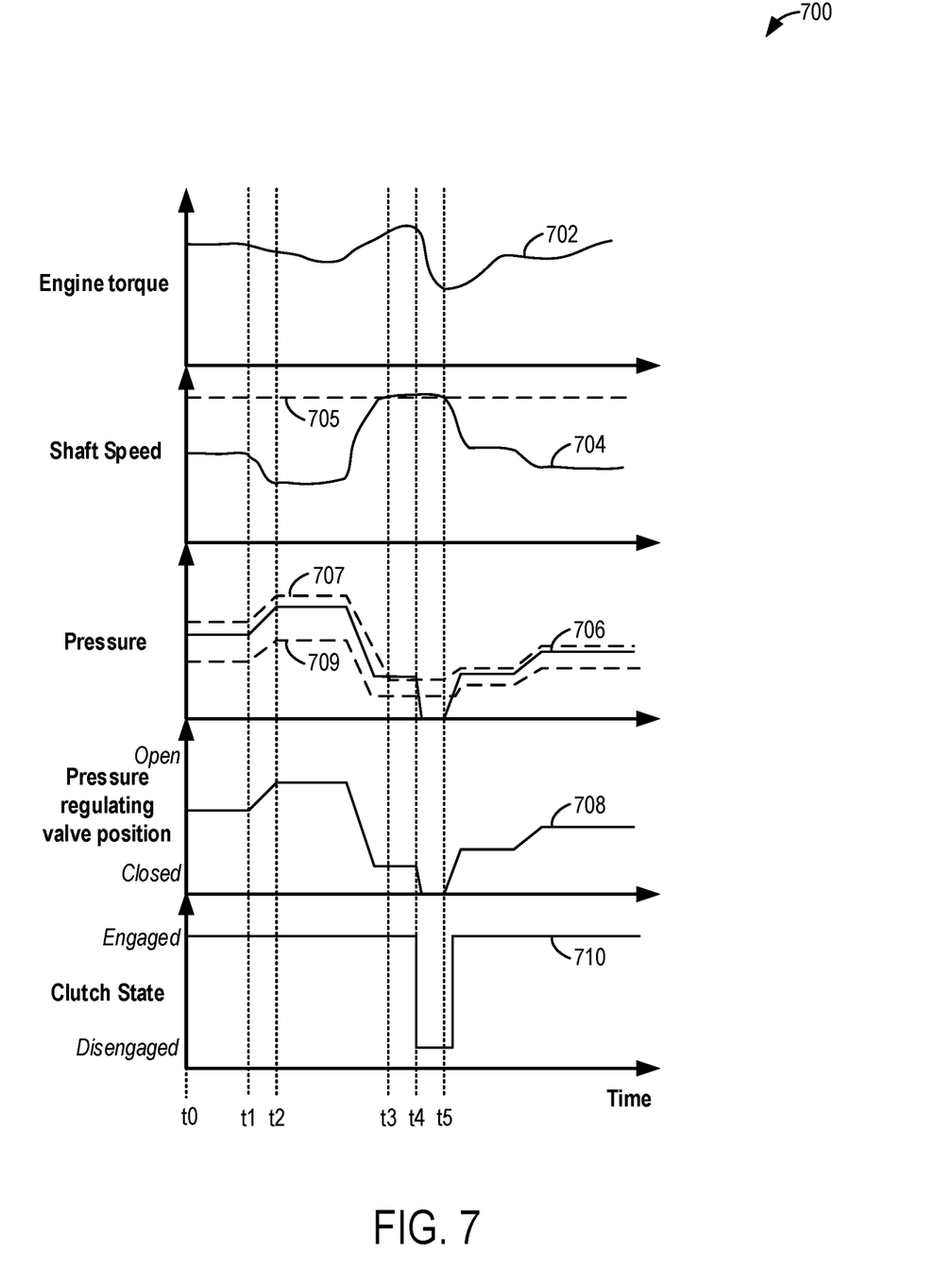
FIG. 7 is a prophetic example timeline of wet clutch pressure control during automatic transmission operation.

FIG. 6 shows a graph 600 including example pressure thresholds at different shaft speeds. A vertical axis of graph 600 represents a pressure exerted on a piston within a wet clutch. The pressure value increases up the vertical axis from bottom to top. In the example shown, the pressure is measured in bars. A horizontal axis of graph 600 represents the speed of a shaft, shown in rotations per minute (rpm) in this example. For example, the shaft may be shaft 310 that is in contact with rotary seals 306 of FIG. 3. The shaft speed increases along the horizontal axis from left to right.

Graph 600 includes a typical fixed clutch pressure 602. For example, a vehicle with a transmission without varied clutch pressure control may apply a constant pressure of 24 bars on each clutch. The same pressure is applied to the rotary seals as they are connected through a hydraulic channel and/or tube (e.g. second hydraulic channel 308 as shown in FIG. 3). However, at medium to high shaft speeds, such as shaft speeds greater than approximately 1500 rpm, fixed clutch pressure 602 surpasses an upper threshold pressure 604. Upper threshold pressure 604 may correspond to the upper threshold pressure described above at 504 of FIG. 5, for example, and varies based on the shaft speed. As shown, the upper threshold pressure 604 decreases as the speed of the shaft increases. Upper threshold pressure 604 for engaging the wet clutch may also increase as a durability of a material of a rotary seal increases, which is not shown on the graph. Applying pressures above upper threshold pressure 604 to the rotary seal may cause increased wear or degradation to the rotary seal. This means that operating with fixed clutch pressure 602 may result in increased degradation of the rotary seals above certain shaft speeds. Without adjusting the pressure applied to the clutch, the wear on the rotary seal may be increased.

Graph 600 also includes a lower threshold pressure 608. Lower threshold pressure 608 may correspond to the lower threshold pressure described above at 512 of FIG. 5, for example. As an example, lower threshold pressure 608 may be a minimum piston pressure for maintaining the clutch engaged at the given shaft speed. Lower threshold pressure 608 also decreases as the speed of the shaft increases.

Therefore, a controller (e.g., TCU 134 of FIG. 1) may maintain the piston pressure between the upper threshold pressure 604 and the lower threshold pressure 608 to maintain clutch functionality while reducing rotary seal degradation, such as described above with respect to FIG. 5. For example, FIG. 6 provides one example of a map that may be used while executing method 500 of FIG. 5 to compare a current piston pressure to each of upper threshold pressure 604 and lower threshold pressure 608 at the given shaft speed. As an illustrative example, when the shaft speed is 2000, the controller determines the current upper threshold pressure 604 to be approximately 18 bar and the lower threshold pressure 608 to be approximately 12 bar. If the pressure being applied to the rotary seals and the wet clutch is not within the 12-18 bar range (e.g., a threshold range defined by lower threshold pressure 608 and upper threshold pressure 604), the controller may adjust a pressure regulating valve positioned upstream of the rotary seal and the clutch piston (e.g. first proportional pressure regulating valve 404 shown in FIG. 4) to increase or decrease the pressure to bring the pressure within the 12-18 bar range. If the pressure is already within the 12-18 bar range, an efficiency map 606 of the rotary seals may be applied to calculate a pressure within the thresholds that would allow the rotary seals to function at the most efficient pressure. In the present example, the piston pressure may be adjusted to approximately 14 bar to operate with maximum rotary seal efficiency while also maintaining clutch functionality.

FIG. 7 provides an example timeline 700 of wet clutch piston pressure control. For example, the wet clutch may be the wet clutch 200 shown in FIG. 2 that includes a wet clutch piston. Pressure control may be achieved by the hydraulics diagram shown in FIG. 4. An engine torque is shown in a plot 702, a shaft speed is shown in a plot 704, a speed threshold is shown by a dashed line 705, a pressure is shown in a plot 706, a upper threshold pressure is shown in a plot 707 (e.g. upper threshold pressure 604 of FIG. 6), a lower threshold pressure is shown in a plot 709 (e.g. lower threshold pressure 608 of FIG. 6), a pressure regulating valve position is shown in a plot 708, and a clutch state is shown in a plot 710.

For all of the above, the horizontal axis represents time, with time increasing along the horizontal axis from left to right. Vertical lines at times t0-t5 represent time points of interest. The plots in FIG. 7 are time aligned and occur at the same time. The vertical axis of each plot represents the corresponding labeled parameter. For plots 702, 704, and 706, a magnitude of the labeled parameter increases along the vertical axis from bottom to top. For plot 708, the vertical axis shows the pressure regulating valve position ranging from a fully closed ("closed") position and a fully open ("open") position. For plot 710, the vertical axis shows the clutch state as either engaged or disengaged, as labeled. The engaged state means clutch friction discs and clutch separator discs (e.g., clutch separator discs 210 and clutch friction discs 211 of FIG. 2) are touching. As a result, gears coupled to the clutch will be active within the transmission. The clutch friction discs are open in the disengaged clutch state, resulting in gears coupled to the clutch being inactive within the transmission.

From time t0 to time t1, the system is in a steady state since the shaft speed (plot 704) is relatively constant. Further, the pressure (plot 706) is below the upper threshold pressure (plot 707) and above the lower threshold pressure (plot 709). As such, the pressure (plot 706) may not be adjusted as it is already within the upper and lower threshold pressures (plots 707 and 709, respectively). Minute adjustments to the pressure may be performed according to a rotary seal efficiency map, an example of which may be seen in FIG. 6 (e.g., efficiency map 606). The pressure regulating valve position (plot 708) is in a partially open position, and because the pressure applied to the clutch is greater than the lower threshold pressure, the clutch is engaged.

From time t1 to time t2, a decrease in the shaft speed (plot 704) occurs. As a result, the pressure (plot 706) is increased so as to remain within the desired upper and lower threshold pressures (plots 707 and 709, respectively), which have also increased due to the decrease in the shaft speed (plot 704). To adjust the pressure, the pressure regulating valve position (plot 708) is further opened to increase the flow and allow an increase in pressure (plot 706) on the rotary seals and wet the clutch piston. The pressure is increased with a decrease in shaft speed (plot 704) due to the lower threshold pressure (plot 709) increasing as the shaft speed decreases. The pressure applied to the wet clutch (plot 706) remains above the lower threshold pressure (plot 709), and, as such, the clutch state remains engaged (plot 710).

After time t2 and before time t3, the speed of the shaft increases (plot 704). As a result, both of the upper threshold pressure (plot 707) and the lower threshold pressure (plot 709) decrease. The pressure (plot 706) is decreased accordingly. However, at time t3, the pressure applied to the clutch (plot 706) surpasses the upper threshold pressure (plot 707). Further, the pressure remains above the upper threshold pressure for a threshold duration that elapses between time t3 and time t4. At the same time, the shaft speed (plot 704) is above the speed threshold (dashed line 705), indicating that an overspeeding condition is present. Therefore, at time t4, the engine torque is decreased in order to attempt to decrease the speed of the shaft. Further, the pressure regulating valve is adjusted to the fully closed position (plot 708), where no flow occurs though the valve. This reduces the pressure on the clutch and the rotary seal (plot 706) to below the lower threshold pressure (plot 709). As a result, the clutch is disengaged (plot 710) at time t4.

After time t5, the speed of the shaft (plot 704) decreases so that the shaft speed is below the speed threshold (dashed line 705). Pressure can now be applied back to the wet clutch piston and to the rotary seals. The pressure regulating valve is partially opened (plot 708), allowing hydraulic fluid to pass through the pressure regulating valve and apply pressure to the wet clutch piston. As a result, the pressure (plot 706) applied to the wet clutch piston and to the rotary seals increases. The clutch re-engages (plot 710) responsive to the pressure (plot 706) increasing above the lower threshold pressure (plot 709) shortly after time t5, activating any gears the clutch may be coupled to.

In this way, a wet clutch may be accurately controlled while drag on a rotary seal is also reduced. As a result, wear of the rotary seal may be reduced. By reducing the wear of the rotary seal, a lifetime of the rotary seal may be extended. This may in turn reduce repair and maintenance costs and may also reduce a downtime of the transmission. Further, an efficiency of the seal may be increased. Overall, customer satisfaction may be increased.

The technical effect of varying a hydraulic pressure applied to a rotary seal and a wet clutch based on a rotational speed of a shaft proximate to the rotary seal is that degradation of the rotary seal may be reduced while engagement of the wet clutch is maintained.

The disclosure also provides support for a method for hydraulic control of a clutch in a transmission, comprising: determining an upper threshold pressure based on a rotational speed of a shaft of the transmission, determining a lower threshold pressure based on the rotational speed of the shaft, and adjusting a pressure of hydraulic fluid applied to the clutch to be between the upper threshold pressure and the lower threshold pressure. In a first example of the method, the lower threshold pressure is a minimum pressure for maintaining the clutch closed and transferring applied torque via the clutch. In a second example of the method, optionally including the first example, the upper threshold pressure is further based on one or more properties of a rotary seal positioned between the shaft and a housing of the transmission. In a third example of the method, optionally including one or both of the first and second examples, adjusting the pressure of the hydraulic fluid applied to the clutch to be between the upper threshold pressure and the lower threshold pressure comprises adjusting an opening of a pressure regulating valve positioned in a flow path between an oil pan and a piston of the clutch. In a fourth example of the method, optionally including one or more or each of the first through third examples, the rotary seal is positioned in the flow path, downstream of the pressure regulating valve, and adjusting the pressure of the hydraulic fluid applied to the clutch to be between the upper threshold pressure and the lower threshold pressure further comprises further opening the pressure regulating valve to increase the pressure of the hydraulic fluid applied to the clutch and further closing the pressure regulating valve to decrease the pressure of the hydraulic fluid applied to the clutch. In a fifth example of the method, optionally including one or more or each of the first through fourth examples, adjusting the opening of the pressure regulating valve positioned in the flow path between the oil pan and the piston of the clutch comprises further closing the pressure regulating valve responsive to the pressure of the hydraulic fluid applied to the clutch being greater than the upper threshold pressure and further opening the pressure regulating valve responsive to the pressure of the hydraulic fluid applied to the clutch being less than the lower threshold pressure. In a sixth example of the method, optionally including one or more or each of the first through fifth examples, the pressure regulating valve is a proportional valve. In a seventh example of the method, optionally including one or more or each of the first through sixth examples, the method further comprises: opening the clutch responsive to the pressure of the hydraulic fluid applied to the clutch being greater than the upper threshold pressure for at least a threshold duration. In an eighth example of the method, optionally including one or more or each of the first through seventh examples, opening the clutch includes reducing the pressure of the hydraulic fluid applied to the clutch to zero. In a ninth example of the method, optionally including one or more or each of the first through eighth examples, the method further comprises: reducing a torque output of an engine rotationally coupled to the transmission responsive to the pressure of the hydraulic fluid applied to the clutch being greater than the upper threshold pressure for at least the threshold duration.

The disclosure also provides support for a method for controlling a wet clutch of a transmission, comprising: adjusting a pressure regulating valve positioned in a flow path supplying hydraulic fluid to a piston of the wet clutch based on a speed of a shaft of the transmission and one or more properties of a rotary seal positioned between the shaft and a housing of the transmission. In a first example of the method, adjusting the pressure regulating valve positioned in the flow path supplying hydraulic fluid to the piston of the wet clutch based on the speed of the shaft of the transmission and the one or more properties of the rotary seal positioned between the shaft and the housing of the transmission comprises: determining a lower threshold pressure for engaging the wet clutch based on the speed of the shaft of the transmission, determining an upper threshold pressure for engaging the wet clutch based on the speed of the shaft of the transmission and the one or more properties of the rotary seal, increasing an opening of the pressure regulating valve in response to a pressure applied to the piston of the wet clutch by the hydraulic fluid decreasing below the lower threshold pressure, and decreasing the opening of the pressure regulating valve in response to the pressure applied to the piston of the wet clutch by the hydraulic fluid increasing above the upper threshold pressure. In a second example of the method, optionally including the first example, the method further comprises: decreasing an output of an engine coupled to the transmission in response to the pressure applied to the piston of the wet clutch by the hydraulic fluid increasing above the upper threshold pressure for at least a threshold duration. In a third example of the method, optionally including one or both of the first and second examples, each of the upper threshold pressure for engaging the wet clutch and the lower threshold pressure for engaging the wet clutch decreases as the speed of the shaft of the transmission increases. In a fourth example of the method, optionally including one or more or each of the first through third examples, the one or more properties of the rotary seal include a material, a thickness, and a diameter of the rotary seal. In a fifth example of the method, optionally including one or more or each of the first through fourth examples, the upper threshold pressure for engaging the wet clutch increases as a durability of the material increases.

The disclosure also provides support for a system for a transmission, comprising: a rotatable shaft positioned within a static housing, a first hydraulic channel within the static housing, a second hydraulic channel within the rotatable shaft, rotary seals positioned on an outer peripheral surface of the rotatable shaft and in contact with an inner surface of the static housing, the rotary seals forming a fluidic coupling between the first hydraulic channel and the second hydraulic channel, a clutch fluidically coupled to the second hydraulic channel, and a controller storing executable instructions in non-transitory memory that, when executed, cause the controller to: adjust a hydraulic pressure applied to the rotary seals based on a current speed of the rotatable shaft while the clutch is engaged. In a first example of the system, to adjust the hydraulic pressure applied to the rotary seals based on the current speed of the rotatable shaft, the controller includes further instructions stored in non-transitory memory that, when executed, cause the controller to: determine a lower threshold pressure as a minimum pressure for engaging the clutch at the current speed of the rotatable shaft, determine an upper threshold pressure based on the current speed of the rotatable shaft, including increasing the upper threshold pressure as the current speed of the rotatable shaft decreases and decreasing the upper threshold pressure as the current speed of the rotatable shaft increases, and adjust the hydraulic pressure applied to the rotary seals to be between the lower threshold pressure and the upper threshold pressure. In a second example of the system, optionally including the first example, the system further comprises: a pressure regulating valve positioned upstream of the first hydraulic channel, and wherein to adjust the hydraulic pressure applied to the rotary seals to be between the lower threshold pressure and the upper threshold pressure, the controller includes further instructions stored in non-transitory memory that, when executed, cause the controller to: further open the pressure regulating valve in response to the hydraulic pressure decreasing below the lower threshold pressure, and further close the pressure regulating valve in response to the hydraulic pressure increasing above the upper threshold pressure. In a third example of the system, optionally including one or both of the first and second examples, the controller includes further instructions stored in non-transitory memory that, when executed, cause the controller to: decrease an output of an engine coupled to the transmission in response to operating with the hydraulic pressure above the upper threshold pressure for at least a threshold duration.

Certain adaptations and modifications of the described embodiments can be made. Therefore, the above discussed embodiments are considered to be illustrative and not restrictive. The present disclosure is not to be limited in scope by the specific embodiments described herein. Further example embodiments may also include all of the steps, features, compositions and compounds referred to or indicated in this description, individually or collectively and any and all combinations or any two or more of the steps or features.

Throughout this document, the use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more. The words "comprising" (and any form of comprising, such as "comprise' and comprises), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

In the present specification and in the appended claims, various terminology which is directional, geometrical and/or spatial in nature such as "longitudinal", "horizontal", "front", "forward", "backward", "back", "rear", "upwardly", "downwardly", etc. is used. It is to be understood that such terminology is used for ease of description and in a relative sense only and is not to be taken in any way as specifying an absolute direction or orientation.

Note that the example control and estimation routines included herein can be used with various transmission and/or vehicle system configurations. The control methods and routines disclosed herein may be stored as executable instructions in non-transitory memory and may be carried out by the control system including the controller in combination with the various sensors, actuators, and other hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the control system, where the described actions are carried out by executing the instructions in a system including the various hardware components in combination with the electronic controller.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for hydraulic control of a clutch in a transmission, comprising:
   determining an upper threshold pressure based on a rotational speed of a shaft of the transmission;
   determining a lower threshold pressure based on the rotational speed of the shaft;
   adjusting a pressure of hydraulic fluid applied to the clutch to be between the upper threshold pressure and the lower threshold pressure; and
   opening the clutch responsive to the pressure of the hydraulic fluid applied to the clutch being greater than the upper threshold pressure for at least a threshold duration.

2. The method of claim 1, wherein the lower threshold pressure is a minimum pressure for maintaining the clutch closed and transferring applied torque via the clutch.

3. The method of claim 1, wherein the upper threshold pressure is further based on one or more properties of a rotary seal positioned between the shaft and a static housing.

4. The method of claim 3, wherein adjusting the pressure of the hydraulic fluid applied to the clutch to be between the upper threshold pressure and the lower threshold pressure comprises adjusting an opening of a pressure regulating valve positioned in a flow path between an oil pan and a piston of the clutch.

5. The method of claim 4, wherein the rotary seal is positioned in the flow path, downstream of the pressure regulating valve, and adjusting the pressure of the hydraulic fluid applied to the clutch to be between the upper threshold pressure and the lower threshold pressure further comprises further opening the pressure regulating valve to increase the pressure of the hydraulic fluid applied to the clutch and further closing the pressure regulating valve to decrease the pressure of the hydraulic fluid applied to the clutch.

6. The method of claim 4, wherein adjusting the opening of the pressure regulating valve positioned in the flow path between the oil pan and the piston of the clutch comprises further closing the pressure regulating valve responsive to the pressure of the hydraulic fluid applied to the clutch being greater than the upper threshold pressure and further opening the pressure regulating valve responsive to the pressure of the hydraulic fluid applied to the clutch being less than the lower threshold pressure.

7. The method of claim 4, wherein the pressure regulating valve is a proportional valve.

8. The method of claim 1, wherein opening the clutch includes reducing the pressure of the hydraulic fluid applied to the clutch to zero.

9. The method of claim 1, further comprising:
   reducing a torque output of an engine rotationally coupled to the transmission responsive to the pressure of the hydraulic fluid applied to the clutch being greater than the upper threshold pressure for at least the threshold duration.

10. A method for controlling a wet clutch of a transmission, comprising:
    while the wet clutch remains engaged, adjusting a pressure regulating valve positioned in a flow path that supplies hydraulic fluid to a piston of the wet clutch based on a speed of a shaft of the transmission and one or more properties of a rotary seal positioned between the shaft and a static housing;
    wherein the hydraulic fluid in the flow path applies a pressure to the rotary seal.

11. The method of claim 10, wherein adjusting the pressure regulating valve positioned in the flow path supplying hydraulic fluid to the piston of the wet clutch based on the speed of the shaft of the transmission and the one or more properties of the rotary seal positioned between the shaft and the static housing comprises:
    determining a lower threshold pressure for engaging the wet clutch based on the speed of the shaft of the transmission;
    determining an upper threshold pressure for engaging the wet clutch based on the speed of the shaft of the transmission and the one or more properties of the rotary seal;
    increasing an opening of the pressure regulating valve in response to a pressure applied to the piston of the wet clutch by the hydraulic fluid decreasing below the lower threshold pressure; and
    decreasing the opening of the pressure regulating valve in response to the pressure applied to the piston of the wet clutch by the hydraulic fluid increasing above the upper threshold pressure.

12. The method of claim 11, further comprising:
    decreasing an output of an engine coupled to the transmission in response to the pressure applied to the piston of the wet clutch by the hydraulic fluid increasing above the upper threshold pressure for at least a threshold duration.

13. The method of claim 11, wherein each of the upper threshold pressure for engaging the wet clutch and the lower threshold pressure for engaging the wet clutch decreases as the speed of the shaft of the transmission increases.

14. The method of claim 10, wherein the one or more properties of the rotary seal include a material, a thickness, and a diameter of the rotary seal.

15. The method of claim 14, wherein the upper threshold pressure for engaging the wet clutch increases as a durability of the material increases.

16. A system for a transmission, comprising:
a rotatable shaft positioned within a static housing;
a first hydraulic channel within the static housing;
a second hydraulic channel within the rotatable shaft;
rotary seals positioned on an outer peripheral surface of the rotatable shaft and in contact with an inner surface of the static housing, the rotary seals forming a fluidic coupling between the first hydraulic channel and the second hydraulic channel;
a clutch that includes a piston which is fluidically coupled to the second hydraulic channel; and
a controller storing executable instructions in non-transitory memory that, when executed, cause the controller to:
adjust a hydraulic pressure applied to the rotary seals and the piston based on a current speed of the rotatable shaft while the clutch is engaged;
wherein to adjust the hydraulic pressure applied to the rotary seals based on the current speed of the rotatable shaft, the controller includes further instructions stored in non-transitory memory that, when executed, cause the controller to:
determine a lower threshold pressure as a minimum pressure for engaging the clutch at the current speed of the rotatable shaft;
determine an upper threshold pressure based on the current speed of the rotatable shaft, including increasing the upper threshold pressure as the current speed of the rotatable shaft decreases and decreasing the upper threshold pressure as the current speed of the rotatable shaft increases; and
adjust the hydraulic pressure applied to the rotary seals to be between the lower threshold pressure and the upper threshold pressure.

17. The system of claim 16, further comprising a pressure regulating valve positioned upstream of the first hydraulic channel, and wherein to adjust the hydraulic pressure applied to the rotary seals to be between the lower threshold pressure and the upper threshold pressure, the controller includes further instructions stored in non-transitory memory that, when executed, cause the controller to:
further open the pressure regulating valve in response to the hydraulic pressure decreasing below the lower threshold pressure; and
further close the pressure regulating valve in response to the hydraulic pressure increasing above the upper threshold pressure.

18. The system of claim 16, wherein the controller includes further instructions stored in non-transitory memory that, when executed, cause the controller to:
decrease an output of an engine coupled to the transmission in response to operating with the hydraulic pressure above the upper threshold pressure for at least a threshold duration.

* * * * *